United States Patent
Bader

(10) Patent No.: US 7,371,430 B2
(45) Date of Patent: May 13, 2008

(54) METHOD FOR STRUCTURING ENDLESS BELTS FOR PRESSES

(75) Inventor: Dieter Bader, Berndorf (AT)

(73) Assignee: Berndorf Band GmbH & Co., Berndorf (AT)

( * ) Notice: Subject to any disclaimer, the term of this patent is extended or adjusted under 35 U.S.C. 154(b) by 664 days.

(21) Appl. No.: 10/477,744

(22) PCT Filed: May 17, 2002

(86) PCT No.: PCT/AT02/00151

§ 371 (c)(1),
(2), (4) Date: Nov. 24, 2003

(87) PCT Pub. No.: WO02/094580

PCT Pub. Date: Nov. 28, 2002

(65) Prior Publication Data

US 2004/0131777 A1  Jul. 8, 2004

(30) Foreign Application Priority Data

May 22, 2001  (AT)  ................................ A 813/2001

(51) Int. Cl.
*B05D 5/00* (2006.01)
*B05D 5/02* (2006.01)
*B05D 3/06* (2006.01)
*C08J 7/00* (2006.01)

(52) U.S. Cl. .................. 427/287; 427/256; 427/555
(58) Field of Classification Search ................ 427/256, 427/287
See application file for complete search history.

(56) References Cited

U.S. PATENT DOCUMENTS 5,037,665 A * 8/1991 LaMantia et al. .............. 427/8

FOREIGN PATENT DOCUMENTS

| DE | 4033230 A1 * | 4/1992 |
| DE | 4033230 A1 | 4/1992 |
| DE | 4329338 A1 * | 3/1995 |
| DE | 4329338 A1 | 3/1995 |
| DE | 19708178 A1 | 9/1998 |
| EP | 0492351 A1 | 7/1992 |
| EP | 559900 A1 * | 9/1993 |
| EP | 0559900 A1 | 9/1993 |
| EP | 0733951 A2 | 9/1996 |
| EP | 1034876 A1 * | 9/2000 |
| EP | 1034876 A1 | 9/2000 |
| JP | 2001134627 A * | 5/2001 |
| WO | WO95/23244 | 8/1995 |
| WO | WO 9523244 A1 * | 8/1995 |

* cited by examiner

*Primary Examiner*—William Phillip Fletcher, III
*Assistant Examiner*—Cachet Sellman
(74) *Attorney, Agent, or Firm*—Jacobson Holman PLLC

(57) ABSTRACT

The invention relates to a method for structuring endless belts (1), particularly steel belts, for presses, e.g. double belt presses. According to the invention, a coating is applied to an outer surface of the belt after which metal is removed from and/or applied to the belt. The coating is formed by individual drops, which are projected against the outer surface of the belt and remain thereupon and/or, as done in the prior art, a surface-covering coating is applied, which is degraded and/or removed, e.g. oxidized, in a preferably point-by-point manner by the action of thermally active beams, particularly laser beams, whereupon metal is removed from and/or applied to the uncoated area.

11 Claims, 1 Drawing Sheet

METHOD FOR STRUCTURING ENDLESS BELTS FOR PRESSES

Figure 1:
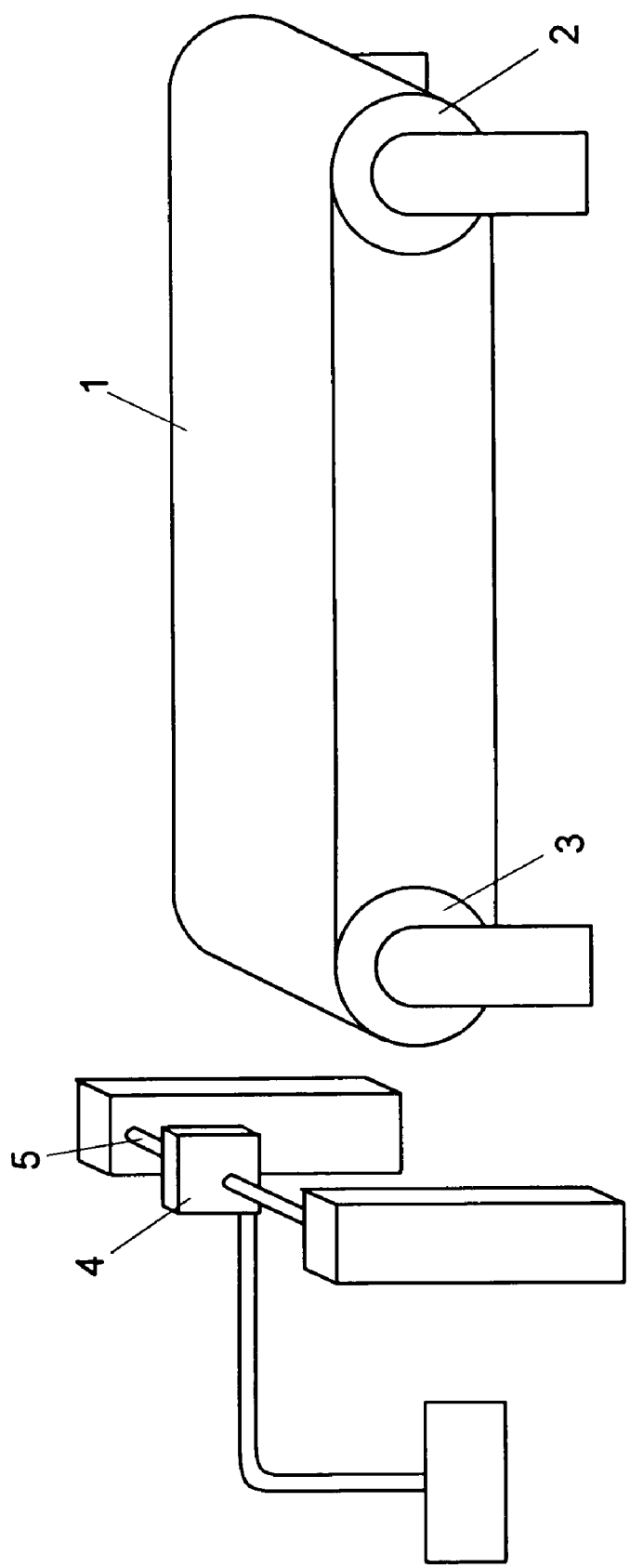

This is a nationalization of PCT/AT02/00151 filed May 17, 2002 and published in German.

The invention relates to a process for the structuring of endless bands, in particular steel bands, for presses, e.g. double band presses.

Presses have a multi-faceted objective. Specifically, a densification of products, in given cases with the application of heat or cold, and a certain surface structure are supposed to be achieved. For this purpose, presses of different construction can be used. In order to carry out the continuous production of goods such as, e.g. particle boards, decorative plates, or the like, presses with endless bands, in particular double band presses, are used. In these presses the product is not only formed by the surface of the band but also simultaneously conveyed by the device, where the action of heat or cold can take place simultaneously, according to whether there are thermosetting or thermoplastic plastic layers or binding agents. Particularly high demands are made on the constitution of the work surface of bands of this type. If plane surfaces are to be obtained, then bands of this type are processed mechanically to form a high surface quality and then, in given cases, provided with a chromium layer.

If it is intended to achieve a certain structuring, indented or raised, e.g. in the form of a wood grain or cork, of the surface, then various processes are known. Thus, for example, it is possible to apply to the surface uniform layer of a radiation cross-linking material, for example, with slightly cross-linked plastic which through the action of UV radiation, but also light, in particular blue light, cross-links further and thus becomes insoluble for certain solvents such as water. After illumination of the surface the non-illuminated plastic can be washed off and subsequently either an etching or also an application of metal, e.g. copper, can be carried out.

An additional, widely used process for the application of protective layers which are supposed to prevent either the removal of the metallic surfaces or a deposition of metals consists of either acid-resistant or acid-sensitive coatings being applied to endless bands of this type via rubber-elastic rollers, e.g. of silicone rubber, so that thereafter the removal of the metal, or the coating with a metal, can be carried out. It is disadvantageous in this process that the patterns of the structuring can only be applied with an original size. Bands with a length of, for example, 40 m can, for example, have 20 structures. The band lengths have, however, different lengths depending on the machine, and depending on themselves for the same machine, so that, in given cases, an area on the band remains free of the structures. In order to structure this area as well, it is developed as an extension of a structure by the artistically talented in order to bridge the empty space. Manual compensation of this type has the consequence that for a plurality of patterns at least one pattern is arranged differently, even if slightly differently, on the steel band so that, e. g. in the production of decorative plates with a structured surface, for example, each twentieth decorative plate is different from the other nineteen, or all twenty patterns must be adapted by hand.

For the present invention the goal is set of providing a process for the structuring of endless bands in which there is identical representation on the band of all the patterns with the complete content of the image, without regard to the length, and, in given cases, the width, of the same and wherein undesired spaces can be avoided. The products, which are produced with bands according to the process according to the invention, can be completely identical so that additional material losses no longer occur and also expensive manual adaptation no longer has to be carried out.

The process according to the invention for the structuring of endless bands, in particular steel bands, for presses, e.g. double band presses, wherein a coating is applied to the outer surface of the band and then metal is removed from the band and/or applied to it consists essentially of a coating being formed by individual drops which are projected against the outer surface of the band and remain on it and/or, as is known per se, a full-surface coating being applied which, preferably point wise, is decomposed and/or removed, e.g. oxidized, by the action of thermally acting radiation, in particular laser radiation, after which metal is removed from and/or applied to the uncoated areas. By the application or the removal of the coating with individual drops, or at individual points, an enlargement or reduction of the image to be formed can be carried out in the simplest manner since only the number and/or drop size [sic] or points, which are kept particularly small, is/are determinative for the possible precise enlargement or reduction. Furthermore, there is the possibility of regulating the spacing of the drops relative to one another so that a completely desired, precise filling of the endless band is possible. Due to the fact that the drops or points are projected against the outer surface of the band, therefore, for example, thrown, a desired, as precise as possible, positioning of the individual drops or points is made possible, e.g. via rollers or the like, which is not changed, in particular in its longitudinal or axial extension, by the transfer of the image to be formed. With the point wise removal, which is accomplished by thermal action, of an initially full-surface coating, which is, for example, acid-resistant or solvent-resistant, the desired structures can be extended or shrunken and then the metal surfaces which are exposed, in particular in the form of a point, are partially removed or coated with metal. Thermally acting radiation is understood to mean IR radiation, laser radiation, microwaves, or the like. Through the metallic change, specifically removal of the metal or the application of the metal, on the uncoated areas, the structuring can be carried out by processes, which are already established in technology.

If the individual drops strike the band essentially simultaneously from a plurality of openings, then particularly small drops can be projected onto the band, where the speed of the coating process does not have to be affected.

If, during the coating of the band, there is a movement of the band and openings relative to one another in the longitudinal or transverse direction of the band, then it is not required that the band first be provided with a layer which, for example, is sensitive to radiation and that an illumination of the coated areas, e.g. according to the image, are carried out but rather a quasi-continuous coating of the band or continuous removal can be carried out.

If, during the action of the thermally acting radiation, there is a movement of the band and the source of the thermally acting radiation source relative to one another in the longitudinal or transverse direction of the band, then a completely exact representation can be achieved via the control of the relative speed, where, by changing the same, an adaptation in accordance with the length or width of the structures to be represented can also be achieved in the simplest manner.

If the coating of the metallic surface of the band is done directly on the metallic surface, then a particularly simple process results, wherein by omission of intermediate layers the precision of the coating can be realized particularly simply.

If, after the projection of the drops onto the metallic surface, in particular by the action of radiation, the coating is fixed, e.g. polymerized, then the solvent behavior of the layers can be changed to the extent that subsequent removal or application processes are to be realized particularly simply.

If, after the fixing of the drops, metal of the band is applied/removed, then a particularly plane base layer of the structured endless band can be obtained.

If, after metal application and/or removal with individual drops, the same band is coated once again and once again metal is removed and/or applied, the different layer thicknesses in the structuring can be obtained in a particularly simple manner.

If, after the application or removal of metal, the same band is once again provided with a full-surface coating which, preferably point wise, is decomposed and/or removed, e.g. oxidized, by the action of thermally acting radiation, in particular laser radiation, then a structuring on the band of a different depth can be achieved in a particularly simple manner.

From EP 0 492 351 A2, which relates to printing technology, it is a known practice to adapt, in accordance with the length and width, patterns for a stencil for screen printing. Therein a screen, i.e. a loose fabric, e.g. of silk, polyester, or the like, is provided with a film with light-sensitive material. This layer is then provided by means of a jet printer according to the image to be represented. This image is adapted with a data processing system to the size of the screen. Thereafter there is illumination whereupon the non-illuminated places can be dissolved out. With a process of this type it is possible to prepare a multi-colored serigraph since a particularly precise adaptation of the individual colors is made possible.

The process according to the invention for representing a plurality of individual identical structures on the endless band, which are arranged in sequence, consists essentially of the length and/or width of the structures being changed in proportion to the total length and/or width of all the structures taken together. With a process of this type it can be achieved that either there are no spaces between the individual patterns of an endlessly produced band or there are only negligible empty intervals between the individual patterns in order to enable cutting the same to length according to the product desired, for example, melamine resin decorative plates.

If the length and/or width of the individual patterns is/are determined and recorded, preferably stored, and subsequently the length and/or the width of the endless band is/are divided by that of the pattern and then the individual structures are adapted in their length and/or width to [sic] an integral multiple of the length and/or the width of the band, then a particular pattern can be adapted to the dimensions of a band in a particularly simple manner.

If, after the application and/or removal of the metal to/from the band and the fixed coating of the band, the band is chrome-plated, in particular hard chrome-plated, then, as is known per se, a particularly resistant surface can be achieved which can be responsible for a long service lifetime.

In the following the process is explained in more detail with the aid of the drawing and the examples.

The single figure shows in schematic representation a coating system for an endless band.

The system for coating represented in the Figure has an endless band 1 which is deflected, or driven, over rollers 2 and 3. At one end is a coating system, which has a projection head 4 which can be moved along the spindle 5 by turning the same in the longitudinal direction of the spindle. The projection head 4 has a plurality of jets, e.g. one hundred, through which the coated material projects onto the steel band, thus being accelerated.

EXAMPLE 1

A pattern, according to which the desired structuring is supposed to be performed, is recorded with a scanner, or is already present in digitized form. The pattern is stored in a data processing system's fixed memory, which then serves to control the projection head. The band of stainless steel is set in rotation at 24 m per minute. The rotational speed of the band is controlled via the number of revolutions per minute of the drive roller. The band has a marking and the time is determined which is needed for the mark to pass by the sensor once again. When a uniform motion has been established, then drop-wise coating from the jet head can begin. The drops are accelerated with a frequency of 10 kHz through the one hundred jets in a 40 µ raster onto the band. A head of this type is the state of the art and can, for example, be taken from EP 0 733 951 A2. After a complete longitudinal row has been applied to the band as coating, the jet head is displaced transversely to the longitudinal direction of the band and the coating is done again. The control of the jet head is handled via a data processing system in which the image recorded by the scanner is modified, by the formation of a quotient, in its length and, in given cases, in its width in such a manner that there are completely proportional identical images on the band without undesired empty spaces. Then the band of austenitic steel with % by weight

| Carbon | 0.1 |
|---|---|
| Chromium | 17.1 |
| Nickel | 7.2 |
| Remainder iron | | was etched with an acidic etching bath with $FeCl_3$. Thereafter the coating was removed with an organic solvent from the surface of the band and an additional coating in the form of points, as already described, was applied and etched once again. This process was repeated three times so that there were three different etching depths. Through the etching process a continuous transition between the individual etchings is brought about.

The endless band obtained has 20 identical structures, where there are no undesired intermediate spaces.

EXAMPLE 2

In accordance with Example 1, a band, which was provided over its entire surface with an unsaturated polyester resin coating, which was hardened with UV radiation and has a thickness of 100 µm, was mounted in the system according to the drawing. The projection head was formed by an Nd-Yag laser with 800 Watt input power. The frequency of the laser pulse was 10 kHz.

The coating was decomposed with a point size with a diameter of 60µ, where a raster of 40µ was maintained. Then a deposition of copper with a layer thickness of 9 µm was performed, the coating dissolved with an organic solvent, a full-surface coating applied once again to the band in the device of the figure in a spray head running transversely over the entire width with a blade disposed behind it in the longitudinal direction and once again decomposed point wise, and subsequently copper was deposited. This process was repeated three times. The band thus obtained was, as known per se, hard chrome-plated and has twenty structures which had no undesired intermediate spaces so that there were twenty completely identical structures on the band, and thus on the product produced.

The adaptation to the band can be done not only in the longitudinal direction but also in the transverse direction. The different lengths and widths can be obtained not only via the data processing system but also via a change of the rotational speed of the band and the size of the increments of the transverse movement of the projection head.

The invention claimed is:

1. A process for the structuring of endless metal bands for presses,
    wherein a coating is applied to an outer surface of the band and then metal is removed from the band and/or applied to the band, and a plurality of individual identical structures on the endless band is arranged in sequence, comprising the steps of:
    adjusting length and/or width of the structures in proportion to total length and/or width of all the structures on the band taken together;
    forming a coating by individual drops which are projected against the outer surface of the band through a plurality of openings of a projection head, wherein the drops are fixed and remain on the band; and
    removing metal from and/or applying metal to an uncoated area on the outer surface of the band.

2. The process according to claim 1, wherein the length and/or width of the endless band is/are determined and recorded and divided by the length and/or width of the individual structures and subsequently the length and/or the width of the individual structures is/are adapted to an integral fraction of the length and/or the width of the band.

3. The process according to claim 1, wherein the individual drops strike the band essentially simultaneously from the plurality of openings.

4. The process according to claim 1, wherein, during the coating of the band, there is a movement of the band and openings relative to one another in the longitudinal or transverse direction of the band.

5. The process according to claim 1, wherein, during the action of a thermally acting radiation, there is a movement of the band and source of the thermally acting radiation source relative to one another in the longitudinal or transverse direction of the band.

6. The process according to claim 1, wherein the coating is carried out directly on the outer surface of the band.

7. The process according to claim 1, wherein, after the projection of the drops onto the outer surface the coating is fixed.

8. The process according to claim 1, wherein, after the fixing of the drops, metal is applied and/or removed to/from the structured endless band.

9. The process according to claim 1, wherein, after application and/or removal of metal, the same band is coated once again with individual drops, after which metal is once again removed and/or applied.

10. The process according to claim 1, wherein, after the application or removal of metal, the same band is once again provided with a surface coating which is removed and/or applied by an action of thermally acting radiation.

11. The process according to claim 1, wherein, after the application and/or removal of the metal to/from the band and after removal of the coating, the band is chrome-plated.

* * * * *